United States Patent Office

3,190,762
Patented June 22, 1965

3,190,762
USE OF SILANES AS CONCRETE ADDITIVES
Barber C. Carlson and Robert C. Hartlein, Midland, Mich., assignors to Dow Corning Corporation, Midland, Mich., a corporation of Michigan
No Drawing. Filed Jan. 28, 1963, Ser. No. 254,402
54 Claims. (Cl. 106—90)

This application is a continuation-in-part of applicants' copending application Serial No. 138,278, filed September 15, 1961, and now abandoned.

This invention relates to improved concrete obtained by admixing certain silanes with concrete. Applicants have discovered that the compressive strength and/or setting times of concrete can be increased when certain silanes are admixed therewith. Applicants have also discovered that the durability of concrete can be improved when certain silanes are admixed therewith.

Furthermore, applicants have found that both compressive strength and the air volume of concrete are increased when certain silanes are admixed therewith in the amounts specified below. This discovery was most unexpected because, heretofore, air-entraining agents have decreased the compressive strength of concrete by about 10 percent. Applicants' method not only increases the air volume and compressive strength, but also increased the durability of concrete.

It is an object of this invention to provide a concrete with improved compressive strength. It is a further object to provide a concrete having both improved compressive strength and increased air content. It is also an object to provide concrete having increased durability.

It is a further object to provide a method for reducing the maximum temperatures produced by hydration during the curing of concrete, thereby allowing more flexibility in pouring large masses of concrete. Another object is to provide a method for increasing the set times of concrete, thereby increasing the flexibility in the pouring of concrete.

This invention relates to an improved concrete and its method of manufacture, said concrete having admixed therewith from 0.05 to 3 percent by weight of a silane of the formula $ZSi(OR')_3$, wherein Z is a member selected from the group consisting of hydrocarbon groups and substituted hydrocarbon groups in which the substituent is bonded to the silicon atom through at least one carbon atom, and R' is selected from the group consisting of alkyl radicals of from 1 to 3 inclusive carbon atoms, $-CH_2CH_2OR'''$, and $-CH_2CH_2OH$ in which R''' is an aliphatic hydrocarbon radical of 1 to 3 inclusive carbon atoms.

The products of this invention are prepared by merely mixing the silane with the concrete and then allowing the concrete to set. The mixing can be done at any stage of the preparation of the concrete. For example, the silane can be thoroughly mixed with Portland cement to produce a dry mix. This dry mix can then be used along with aggregate and water to prepare the concrete. Alternatively, the silanes can be added after the other ingredients of the concrete have been mixed.

For the purpose of this invention Z can be any hydrocarbon or any substituted hydrocarbon radical. Illustrative of the hydrocarbon groups that are represented by Z in the formula above are the aliphatic and cyclo-aliphatic hydrocarbon groups containing from 1 to 18 carbon atoms, aryl groups containing from 6 to 18 carbon atoms, aralkyl groups and alkaryl groups. More specifically Z can be:

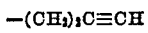
$-(CH_3)_2C{\equiv}CH$       $-CH=CHCH=CH_2$ $-CH_3$    $-CH=CH_2$     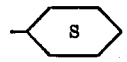      $-CH_2CHCH_3$ $-C_2H_5$    $-CH_2CH=CH_2$     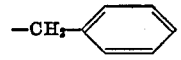

$-C_4H_9$    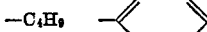     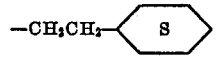

$-C_6H_{13}$    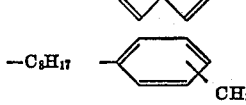     $-C(CH_3)=CH_2$ $-C_8H_{17}$    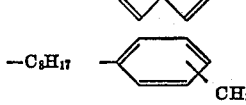 $CH_3$     $-CH=C(CH_3)_2$ $-C_{12}H_{25}$          $(CH_3)_2$ $-C_{18}H_{37}$    $-CH(CH_3)_2$     $-CH=CHCH_2CH=CH_2$ Preferably the hydrocarbon group is a phenyl group or an aliphatic hydrocarbon radical of from 1 to 18 inclusive carbon atoms.

The groups shown are illustrative of the substituted hydrocarbon groups that are represented by Z —(CH₂)₃NH(CH₂)₂NH(CH₂)₁₇CH₃
—(CH₂)₃NH(CH₂)₂NH(CH₂)₁₁CH₃
—(CH₂)₃NH(CH₂)₂NH(CH₂)₂NH₂
—(CH₂)₃NH(CH₃)
—(CH₂)₃NH₂
—(CH₂)₃N(CH₃)₂

—CH₂NH₂
—(CH₂)₃NHNH₂
—(CH₂)₃N≡C

—(CH₂)₂C≡N

—CH₂NH—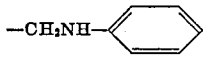

—(CH₂)₂—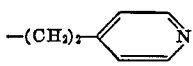

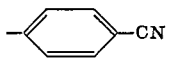—CN

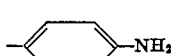—NH₂

—CH₂CH(CH₃)CH₂NHCH₂CH₂NH₂
—(CH₂)₃OOCCH=CH₂

—(CH₂)₃OOCC(CH₃)=CH₂

—(CH₂)₃OCH₂CHCH₂

—(CH₂)₃COOH
—(CH₂)₃OCH₂CH₃
—(CH₂)₃OCH₃
—(CH₂)₃COOCH₂CH₃

O
        ‖
—(CH₂)₂C—CH₃

O        O
        ‖        ‖
—(CH₂)₂C—CH₂—C—CH₃
—CH₂CH(CHO)CH₃
—CH₂CH₂CH(OC₂H₅)₂
—(CH₂)₃COCH₂NH₂

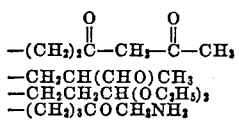—NO₂

—CH₂——CONH—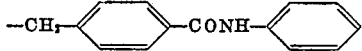

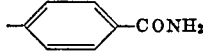—CONH₂

CO—NH
             /      \
—CH₂CH         CO
             \      /
              CO—NH

CO—NH
             /      \
—CH₂C(CH₃)     CO
             \      /
              CO—NH

CO———NH
             /        \
—CH₂CCH₂CH=CH₂    CO
             \        /
              CO———NH

—CH(COOH)CH₂(CH₂)₃CH₃
—(CH₂)₂CH(OH)CH₃
—(CH₂)₂COOH
—CH₂CH(COOH)CH₂CH₂COOH

O
                / \
—(CH₂)₃CH———CH₂

—(CH₂)₃CHO
—(CH₂)₃OH

—(CH₂)₃—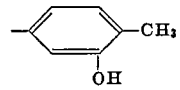—COOH

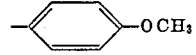—OH      —(CH₂)₃—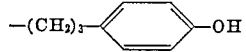—OH

—CH₃
        |
        OH

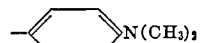—OCH₃

—(CH₂)₂——O—

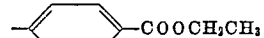—N(CH₃)₂      
                                    O
                                    ‖
                              —(CH₂)₁₀C—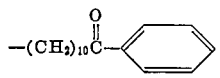

—(CH₂)₃—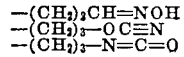—CHO

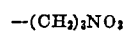—COOCH₂CH₃

—OH

—(CH₂)₂CH=NOH
—(CH₂)₃—OC≡N
—(CH₂)₃—N=C=O

—(CH₂)₃NO₂

—(CH₂)₃OCH₂CH₂CN
—(CH₂)₂CONH₂

—CH₂N=C=S

—(CH₂)₃SH

—(CH₂)₃SCH₂CH₃

—(CH₂)₃S—C≡N

—(CH₂)₃Si(CH₃)₃

O
          ‖
—(CH₂)₃P[C₂H₅]C₆H₅

—(CH₂)₃NHO₂S—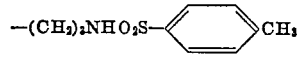—CH₃

O
                 ‖
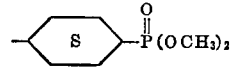—P(OCH₃)₂

—CH$_2$CH$_2$CF$_3$
—(CH$_2$)$_3$Cl
—(CH$_2$)$_4$I
—CH$_2$Cl
—(CH$_2$)$_2$(CF$_2$)$_2$CF$_3$
—CH$_2$CH$_2$CCl$_3$

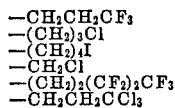

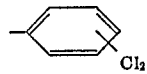

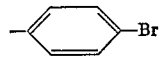

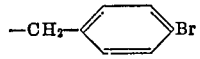

—CF=CF$_2$

—(CH$_2$)$_3$SCH$_2$COOC$_2$H$_5$

R' can be an alkyl radical of from 1 to 3 inclusive carbon atoms, such as methyl, ethyl or isopropyl. R' can also be —CH$_2$CH$_2$OCH$_3$, —CH$_2$CH$_2$OH, —CH$_2$CH$_2$OCH(CH$_3$)$_2$ or —CH$_2$CH$_2$OCH$_2$CH=CH$_2$.

Suitable examples of hydrocarbon-substituted silanes which are operative in this invention include methyltrimethoxysilane, propyltrimethoxysilane, phenyltrimethoxysilane, dodecyltrimethoxysilane, octadecyltrimethoxysilane, CH$_3$Si(OCH$_2$CH$_2$OCH$_3$)$_3$, CH$_3$Si(OCH$_2$CH$_2$OH)$_3$, amyltrimethoxysilane, ethyltrimethoxysilane, vinyltrimethoxysilane and methyltriisopropoxysilane. Suitable examples of substituted hydrocarbon silanes which are operative herein include gamma-mercaptopropyltrimethoxysilane, omega-hydroxyhexytriisopropoxysilane, delta-cyanobutyltriethoxysilane, gamma-aminoamyltriethoxysilane

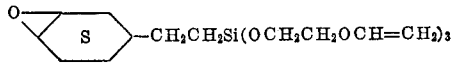

(C$_2$H$_5$OCH$_2$CH$_2$O)$_3$Si(CH$_2$)$_3$P(O)(C$_2$H$_5$)(C$_6$H$_5$) and omega-aminooctadecyl-tris-(β-hydroxyethoxy)silane. These silanes are well known materials and may be prepared by any of the methods commonly known in the art.

Although the invention is not so limited, it is thought that the silanes hydrolyze and condense to form siloxanes when they are mixed with concrete.

Although the over-all range for the addition of these materials to concrete is from 0.05 to 3 percent by weight (based on the weight of Portland cement in the concrete), different effects occur within this range depending upon the type and amount of silane used. All of the previously described silanes retard set times throughout this range. In general, the higher the concentration, the more the set time is retarded. The combination of increased air content and compressive strength is obtained only within certain ranges depending upon the silane used. With the phenyl silanes, both of these effects occur within the range from 0.1 to 0.75 percent by weight. When the propylsilanes are used, the range producing both effects is from 0.3 to 1 percent by weight. When the ethyl and vinyl silanes are used, the range producing both effects is from 1.5 to 3 percent by weight. The ethoxy and propoxy silanes do not increase the air content of concrete, but do increase set time and compressive strength. Both effects are obtained with the other silanes at concentrations from 0.5 to 3 percent by weight.

When the upper limit for these silanes are exceeded, the compressive strengths fall off markedly and the air content of the concrete is raised excessively, e.g., above 7 percent by volume. It is preferable to have an air content between 3 and 7 percent by volume, however, smaller or larger amounts of air can be present. If small quantities of these silanes are used, the air content of the concrete is not appreciably increased. When one is only interested in raising compressive strength of concrete without increasing the air content, amounts smaller than the above limits can be used. For example, the compressive strength of concrete is increased by 0.05 percent by weight of CH$_3$Si(OCH$_3$)$_3$.

When one is only interested in increasing the set time of the concrete without increasing the air content or compressive strength, 0.3 percent by weight of the cyclohexyltrimethoxysilane can be employed. If desired, two or more of the alkoxysilanes can be employed in any one concrete mix. However, in doing so, the effects produced at various concentrations should be kept in mind.

The term "concrete" as employed herein has reference to any material which is based upon Portland cement as a cementing material and which contains an aggregate. The aggregate can be sand, gravel or other solid materials which are normally employed in concrete. The concrete of this invention can also contain any of the additives which are normally added to concrete in order to improve setting characteristics, or to prevent freezing of the concrete in cold weather.

Since most of these silanes, at certain concentrations, increase the air content of concrete, it is not necessary to add air entraining agents. However, when it is desirable to add smaller quantities of these silanes or to use the ethoxy or propoxy silanes, air entraining agents can be advantageously employed in conjunction with the silanes to increase the air content. Examples of commercially available air entraining agents that can be employed in conjunction with the silanes are Vinsol NVX, Darex AEA and Airalon, N-Tair, Ad-Aire, Sulfonate WS, D–40 and D–60, Foamasol and morpholine oleate. Vinsol NVX is the sodium soap of Vinsol resin made by treating the resin with caustic soda. Vinsol resin is a hard, brittle, dark-colored, thermoplastic resin which consists substantially of a petroleum-hydrocarbon insoluble fraction of a coal-tar hydrocarbon extract of pine wood. It contains phenol, aldehyde and ether groups. Darex AEA is a harmless, dark brown, water-soluble triethanolamine salt of a sulphonated hydrocarbon with a viscosity approximately that of water. Airalon consists substantially of hydroaromatic and fatty carboxylic acids being derived from an alkaline process of paper manufacture and neutralized to make a water-soluble soap. The acids, if regenerated from the soap, have an acid number of 150–160. Ad-Aire is a neutralized Vinsol resin liquid. Sulfonate WS is a water-soluble petroleum sodium sulfonate. It consists of 25 percent sodium sulfonate, 15 percent mineral oil, 0.4 percent sodium carboxylate, 0.4 percent free NaOH, 9 percent inorganic salts and the balance water. D–40 and D–60 are dry surface active agents containing approximately 40 percent and 60 percent, respectively, of sodium alkyl benzene sulfonate. Foamasol is a salt of an alkylnaphthalene sulfonic acid and protein materials. Other air entraining agents that can be employed in making concrete are well known and will be obvious to those skilled in the art.

The concrete of this invention can be employed for any structural or non-structural use and can be reinforced and/or prestressed. The concrete of this invention is especially useful when employed as road and bridge surfaces. The compressive strength and the air content are increased (with the exception of the ethoxy and propoxy silanes), by the addition of these silanes at certain concentrations to concrete. The compressive strength is increased at these and even lower concentrations.

The setting time of the concrete is increased by the addition of these silanes. This factor should be taken into consideration when a fast setting time is required. These silanes can be used to specifically increase the setting time of concrete. This can be used to advantage when attempting to pour large unified masses, such as bridges. The amount of silane to be added will depend upon the setting time increase desired. The phenylalkoxysilanes (preferably in amounts from 0.1 to 0.35 percent by weight) are especially effective as set retardants.

The maximum temperatures produced by hydration during curing are reduced when these silanes are admixed with concrete. This is of value when pouring large structures. The amount of water required in the concrete mix is reduced by admixing these silanes with the concrete. The addition of these silanes to concrete increases the durability of the concrete. This is particularly true of concrete (e.g. concrete bridges that is subjected to numerous freeze-thaw cycles.

The following examples are illustrative only and should not be construed as limiting the invention which is properly set forth in the appended claims.

EXAMPLE 1

The concrete employed in this example was prepared by mixing 18 parts by weight Portland cement, and 56.5 parts by weight crushed limestone aggregate, 44.6 parts by weight sand (¼″ particle size and smaller) and 9.6 parts by weight water. In each case the silane was added after a portion of the water had been mixed with the other ingredients. After further mixing, the concrete was poured into 4″ by 8″ cylinders and allowed to set. The silanes used and the properties of these samples are set forth in Table I. The percentages of silanes added are based on the weight of Portland cement in the concrete. The percentages of air in the concrete are based on the volume of concrete and this percentage is determined in accordance with ASTM C-231-56 T. In each case the addition of a silane to the concrete increased the durability of the concrete over concrete containing either no additive or only an air entraining agent. The compressive strength was determined after 7 and 28 days.

*Table I*

| Material | Wt. percent conc. | Percent air | Comp. strength, p.s.i. 7 days | Comp. strength, p.s.i. 28 days |
| --- | --- | --- | --- | --- |
| No additive | | 1.9 | 3,720 | 3,925 |
| Commercial air entraining agent | .013 | 5.4 | 3,000 | 3,450 |
| $CH_3Si(OCH_3)_3$ | 1.25 | 4.8 | 4,245 | 5,405 |
| $C_3H_7Si(OCH_3)_3$ | .75 | 5.3 | 3,625 | 4,210 |
| $C_6H_5Si(OCH_3)_3$ | 0.35 | 5.2 | 4,225 | 5,390 |
| $CH_3Si(OCH_2CH_2OCH_3)_3$ | 1.25 | 4.1 | 4,385 | 5,455 |
| $CH_3Si(OCH_2CH_2OH)_3$ | 1.25 | 5.8 | 4,355 | 5,165 |
| $C_2H_5Si(OCH_3)_3$ | 1.25 | 2.2 | 4,315 | 5,125 |
| $CH_2=CHSi(OCH_3)_3$ | 1.25 | 2.3 | 4,185 | 5,550 |
| $CH_3Si(OC_2H_5)_3$ | 1.25 | 2.2 | 4,915 | 4,820 |
| $CH_3Si(OCH_3)_3$ | 0.25 | 2.4 | | 5,145 |
| $CH_3Si(OCH_3)_3$ | 0.65 | 3.0 | | 5,295 |
| $CH_3Si(OCH_3)_3$ | 0.85 | 4.1 | | 5,585 |
| $CH_3Si[OCH(CH_3)_2]_3$ | 1.25 | 2.3 | 3,650 | 4,815 |

EXAMPLE 2

The concrete employed in this example was prepared by mixing one part by weight Portland cement and 2.5 parts by weight fine sand and sufficient water to increase the flow to 100 percent. The set times were determined by using the Gillmore needle at 100° F. and 100 percent relative humidity (ASTM C-266-587). The initial and final set times are set forth in Table II.

*Table II*

| Material | Wt. percent conc. | Time of set in hours Initial | Time of set in hours Final |
| --- | --- | --- | --- |
| No additive | | 2.5 | 3.5 |
| $CH_3Si(OCH_3)_3$ | 1.25 | 3.5 | 7.5 |
| $C_3H_7Si(OCH_3)_3$ | .75 | 2.75 | 4.75 |
| $C_6H_5Si(OCH_3)_3$ | 0.35 | 5.75 | 11.75 |
| $CH_3Si(OCH_2CH_2OCH_3)_3$ | 1.25 | 4.25 | 9 |
| $CH_3Si(OCH_2CH_2OH)_3$ | 1.25 | 3.5 | 7.75 |
| $C_2H_5Si(OCH_3)_3$ | 1.25 | 3.75 | 6.75 |
| $CH_2=CHSi(OCH_3)_3$ | 1.25 | 3.75 | 8 |
| $CH_3Si(OCH_3)_3$ | 0.1 | 3.5 | 8 |
| $C_2H_5Si(OCH_3)_3$ | 0.1 | 4.5 | 7.5 |
| $C_3H_7Si(OCH_3)_3$ | 0.1 | 4.25 | 6.75 |
| $CH_2=CHSi(OCH_3)_3$ | 0.1 | 4.25 | 5.75 |
| $C_6H_5Si(OCH_3)_3$ | 0.1 | 3.5 | 8 |
| $CH_3Si(OCH_2CH_2OCH_3)_3$ | 0.1 | 3.5 | 6 |
| $CH_3Si(OCH_2CH_2OH)_3$ | 0.1 | 3.75 | 5.25 |

EXAMPLE 3

The concrete employed in this example was prepared by mixing one part by weight of Portland cement, 2 parts by weight fine sand and sufficient water to increase the flow to 100 percent. The following alkoxysilanes were mixed with the concrete after the water had been added to the sand and cement. The percentages of alkoxy silanes added are based on the weight of Portland cement in the concrete. In each case the compressive strength and the percentages of air contained in the concrete was higher than when the concrete contained no additive.

1.25 percent of $C_4H_9Si(OCH_3)_3$
1.25 percent of $C_5H_{11}Si(OCH_3)_3$
2.5 percent of $C_2H_5Si(OCH_3)_3$
2.5 percent of $CH_2=CHSi(OCH_3)_3$
1.25 percent of $C_{12}H_{25}Si(OCH_3)_3$

EXAMPLE 4

The concrete employed in this example was prepared by mixing one part by weight of Portland cement, 3 parts by weight fine sand and sufficient water to increase the flow to 100 percent. The alkoxysilanes were mixed with concrete after the water had been added to the sand and cement. The percentages of alkoxy silanes added are based on the weight of Portland cement in the concrete. The quantity of water required with each material is stated in the table.

*Table III*

| Material | Wt. percent conc. | Water in ml. | Compressive strength p.s.i. 7 days | Compressive strength p.s.i. 28 days |
| --- | --- | --- | --- | --- |
| No additive | | 525 | 1,380 | 2,310 |
| $CH_3Si(OCH_3)_3$ | 0.1 | 525 | 1,680 | 2,535 |
| $CH_3Si(OCH_3)_3$ | 0.3 | 500 | 1,975 | 2,565 |
| $CH_3Si(OCH_3)_3$ | 0.7 | 500 | 2,615 | 2,815 |

EXAMPLE 5

An improved concrete is obtained when the following materials are added to the concrete formulation of Example 1:

1.25 percent by weight $C_8H_{17}Si(OCH_3)_3$
1.25 percent by weight $C_{18}H_{37}Si(OCH_3)_3$
0.2 percent by weight $C_6H_5Si(OCH_3)_3$
3 percent by weight $C_2H_5Si(OCH_3)_3$
2 percent by weight $CH_2=CHCH_2Si(OCH_3)_3$

EXAMPLE 6

The concrete employed in this example was prepared by mixing 27 pounds of Portland cement, 90.2 pounds of crushed limestone aggregate, 64.25 pounds of sand (¼" particle size and smaller) and about 13.5 pounds of water In each case the air entraining agent (control) or silane was added after a portion of the water had been mixed with the other ingredients. The freeze-thaw durability of the samples was tested employing ASTM testing procedure C–290–57T using a 10 percent sodium chloride solution instead of fresh water. The test involved immersing 3" x 4" x 16" bars of the concrete (in stainless steel containers) in a Conrad machine that froze and thawed the test bars in four hour cycles. The test bars were weighed initially, and the weight loss was measured as the test progressed. The number of cycles that it took for a 5 percent weight loss to occur is reported as the durability. The durability reported is the average number of cycles from three bars run. At a 5 percent weight loss the test bar is considered to have failed.

The various cements were also tested and rated visually as to the degree of surface scaling. The top formed bar surface was rated on a scale of from 1 (very slight scaling-excellent surface condition) to 5 (severe scaling). If this surface reaches a scale rating of 5 between 100 to 150 cycles, its scaling resistance is rated as poor (P); 150 to 200 cycles, fair (F); 200 to 250 cycles, good (G); 250 or more cycles, very good (VG). The results are given in the following table:

Table IV

| Material | Wt. percent conc. | Percent air | Set time (hours) Initial | Set time (hours) Final | Compressive strength (p.s.i.) 7 days | Compressive strength (p.s.i.) 28 days | Durability in 10% NaCl | Scaling resistance |
|---|---|---|---|---|---|---|---|---|
| Darex AEA | .133 | 4.7 | 5.5 | 7.5 | 2,820 | 3,195 | 210 | P |
| Vinsol NVX | .02 | 5.5 | 5.5 | 7.5 | 2,990 | 3,570 | 219 | P |
| $C_6H_5Si(OCH_3)_3$ | .3 | 6 | 22 | 24 | 4,256 | 5,903 | [1] 324 | VG |
| $C_6H_5Si(OCH_3)_3$ | .3 | 5.6 | 22 | 24 | 3,463 | 4,816 | 335 | VG |
| $C_6H_5Si(OCH_3)_3$ | .3 | 5.4 | 15.59 | 23.5 | 4,450 | 6,410 | 265 | G |
| $C_6H_5Si(OCH_3)_3$ | .5 | 6 | 28 | 30 | 4,350 | 4,626 | 490 | VG |
| $C_6H_5Si(OCH_3)_3$ | .5 | 6.8 | 28 | 30 | 3,520 | 5,553 | 292 | VG |
| $C_6H_5Si(OCH_3)_3$ | .5 | 5.9 | 28 | 30 | 4,133 | 5,433 | 385 | VG |
| $C_6H_5Si(OCH_3)_3$ | .5 | 5.2 | 28 | 30 | 4,406 | 5,670 | [2] 396 | VG |
| $C_6H_5Si(OCH_2CH_2OCH_3)_3$ | .3 | 6.5 | 13.79 | 28.09 | 4,350 | 6,143 | 325 | VG |
| $H_2N(CH_2)_2NH(CH_2)_3Si(OCH_3)_3$ | .2 | 4.7 | | | | 4,120 | 343 | VG |
| $H_2N(CH_2)_2NH(CH_2)_3Si(OCH_3)_3$ | .3 | 5.5 | 21 | 24 | 3,455 | 4,380 | 455 | VG |
| $H_2N(CH_2)_2NH(CH_2)_3Si(OCH_3)_3$ | .3 | 2.5 | 21 | 24 | 3,943 | 5,723 | | |
| $H_2N(CH_2)_2NH(CH_2)_3Si(OCH_3)_3$ | .3 | 2.7 | 21 | 24 | 4,790 | 5,706 | | |
| $H_2N(CH_2)_2NH(CH_2)_3Si(OCH_3)_3$ | .3 | 3.9 | 21 | 24 | 4,296 | 5,750 | [2] 317 | |
| $H_2N(CH_2)_2NH(CH_2)_3Si(OCH_3)_3$ | .3 | 2.7 | 21 | 24 | 4,713 | 6,295 | 236 | VG |
| $H_2N(CH_2)_2NH(CH_2)_3Si(OCH_3)_3$ | .3 | 3.4 | 21 | 24 | 4,440 | 5,780 | 410 | VG |
| $H_2N(CH_2)_2NH(CH_2)_3Si(OCH_3)_3$ | .5 | 3.8 | | | | 4,220 | 442 | VG |
| $\overset{O}{\underset{\triangle}{CH_2\text{——}CH}}CH_2O(CH_2)_3Si(OCH_3)_3$ | .3 | 2.8 | 11 | 12.75 | 3,520 | 4,136 | [1] 230 | VG |
| $\overset{O}{\underset{\triangle}{CH_2\text{——}CH}}CH_2O(CH_2)_3Si(OCH_3)_3$ | .3 | 6.5 | 11 | 12.75 | 3,183 | 4,176 | 362 | F |
| $F_3CCH_2CH_2Si(OCH_3)_3$ | .3 | 4 | 14.29 | 22 | 4,243 | 6,193 | 232 | G |
| $Cl_2C_6H_3Si(OCH_3)_3$ | .3 | 8.4 | 15.29 | 31.75 | | 3,980 | 241 | VG |
| $H_2N(CH_2)_2NH(CH_2)_3Si(OCH_3)_3$ / Morpholine oleate | .3 / .08 | 5 | 21 | 24 | 3,146 | 4,746 | 410 | VG |

[1] Only one bar run.  [2] Only two bars run.

The Darex AEA and the Vinsol NVX were included for purpose of comparison.

EXAMPLE 7

The concrete employed in this example was prepared as in Example 6 except that cement from a different lot was used.

Table V

| Material | Wt. percent conc. | Percent air | Set time (hours) Initial | Set time (hours) Final | Compressive strength (p.s.i.) 7 days | Compressive strength (p.s.i.) 28 days | Durability[1] in 10% NaCl | Scaling resistance |
|---|---|---|---|---|---|---|---|---|
| Darex AEA | .12 | 5.2 | 6.25 | 8.5 | 2,670 | 3,240 | 275 | F |
| $H_2N(CH_2)_2NH(CH_2)_3Si(OCH_3)_3$ | .2 | 2.2 | | | 3,716 | 5,293 | | |
| $H_2N(CH_2)_2NH(CH_2)_3Si(OCH_3)_3$ | .3 | 4.8 | 21 | 24 | 4,073 | 4,966 | 274 | |
| $H_2C=C(CH_3)COO(CH_2)_3Si(OCH_3)_3$ | .1 | 4.3 | | | 3,523 | 4,296 | | |
| $H_2C=C(CH_3)COO(CH_2)_3Si(OCH_3)_3$ | .3 | 13.5 | 18.5 | 22 | 3,840 | 5,420 | 283 | VG |
| $\overset{O}{\underset{\triangle}{H_2C\text{——}CH}}CH_2O(CH_2)_3Si(OCH_3)_3$ | .3 | 4 | 11 | 12.75 | 3,340 | 5,443 | | G |
| $H_2N(CH_2)_2NH(CH_2)_3Si(OCH_3)_3$ / Darex AEA | .2 / .025 | 3.5 | | | 4,190 | 5,190 | | |

[1] All results for one bar only.

EXAMPLE 8

The concrete employed in this example was prepared as in Example 6 except that cement from a different lot was used.

Table VI

| Material | Wt. percent conc. | Percent air | Set time (hours) | | Compressive strength (p.s.i.) | | Durability in 10% NaCl |
|---|---|---|---|---|---|---|---|
| | | | Initial | Final | 7 days | 28 days | |
| Darex AEA | .133 | 5.15 | 5.38 | 7.38 | 2,063 | 2,919 | 164 |
| $CH_3C_6H_4Si(OCH_3)_3$ | .3 | 10 | >27 | <43 | ---------- | 3,020 | >295 |
| $C_6H_5C_6H_4Si(OCH_3)_3$ | .3 | 5.8 | 10 | 13.5 | ---------- | ---------- | ---------- |
| $(CH_3)_2CHC_6H_4Si(OCH_3)_3$ | .3 | 15.5 | >12 | <20 | ---------- | ---------- | 228 |
| naphthyl-$Si(OCH_3)_3$ | .3 | 6.2 | 15.5 | 17.5 | 2,090 | 3,080 | 165 |
| phenyl-$CH_3\overset{\|}{C}HCH_2Si(OCH_3)_3$ | .3 | 4.2 | 8 | 11 | 2,320 | 3,360 | ---------- |
| $(CH_3)_2N(CH_2)_3Si(OCH_3)_3$ | .3 | 15.5 | >15 | <23.5 | ---------- | 2,980 | >288 |
| $Cl(CH_2)_3Si(OCH_3)_3$ | .3 | 2.6 | 10.5 | 13 | 3,660 | 4,640 | ---------- |
| $HOC_6H_4(CH_2)_3Si(OCH_3)_3$ | .3 | 5.2 | >11 | <19 | 2,500 | 3,190 | ---------- |
| $H_2N(CH_2)_2NHCH_2\overset{CH_3}{\underset{\|}{C}}HCH_2Si(OCH_3)_3$ | .3 | 6.2 | 22 | 24 | 3,290 | 5,220 | >227 |

EXAMPLE 9

The concrete employed in this example was prepared by mixing 24.8 pounds of Portland cement, 89.25 pounds of crushed limestone aggregate, 64.25 pounds of sand (¼" particle size and smaller) and about 13.75 pounds of water. The air entraining agent (control) or silane was added after a portion of the water had been mixed with the other ingredients.

Table VII

| Material | Wt. percent conc. | Percent air | Set time (hours) | | Compressive strength (p.s.i.) | |
|---|---|---|---|---|---|---|
| | | | Initial | Final | 7 days | 28 days |
| Darex AEA | .133 | 5.4 | 5.25 | 7.25 | 1,933 | 3,090 |
| $CH_3C_6H_4Si(OCH_3)_3$ | .1 | 2.9 | ---------- | ---------- | ---------- | 4,877 |
| $(CH_3)_2CHC_6H_4Si(OCH_3)_3$ | .1 | 9.4 | ---------- | ---------- | ---------- | ---------- |
| $C_6H_5Si(OCH_3)_3$ | .3 | 3.2 | 22 | 24 | 3,716 | 5,336 |
| $C_6H_5Si(OCH_3)_3$ | .55 | 10 | 12.75 | 14.75 | ---------- | ---------- |
| $C_6H_5Si(OCH_3)_3$ / Morpholine oleate | .11 / .11 | 4.8 | 16 | 18 | 2,626 | 3,676 |

EXAMPLE 10

When the following silanes are employed in the concrete of Example 6 an improved concrete is obtained:

(1) $(C_2H_5O)_3Si(CH_2)CN$
(2) $(CH_3CH_2O)_3Si(CH_2)_3NH_2$
(3) $(C_2H_5OCH_2CH_2O)_3Si(CH_2)_3OCH_2CH_3$
(4) $(CH_3O)_3Si(CH_2)_3COOCH_2CH_3$
(5) $(CH_3O)_3Si(CH_2)_2COCH_3$
(6) $(CH_3O)_3SiCH_2CH(CHO)CH_3$
(7) $(CH_3O)_3Si(CH_2)_2COOH$
(8) $(CH_3O)_3Si(CH_2)_2CH(OH)CH_3$

EXAMPLE 11

When the following silanes are employed in the concrete of Example 7 an improved concrete is obtained:

(1) $(CH_3O)_3Si(CH_2)_3NO_2$
(2) $(CH_3O)_3Si(CH_2)_2CONH_2$
(3) $(CH_3O)_3Si(CH_2)_2(CF_2)_5CF_3$
(4) $(CH_3O)_3Si(CH_2)_3SCH_2CH_3$ (5) 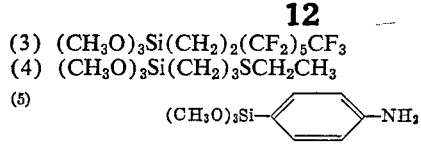

(6) $(CH_3O)_3Si(CH_2)_3P(O)(C_2H_5)(C_6H_5)$
(7) $(CH_2=CHOCH_2CH_2O)_3Si(CH_2)_3Si(CH_3)_3$

EXAMPLE 12

When the following silanes are employed in the concrete of Example 6 an improved concrete is obtained:

(1) 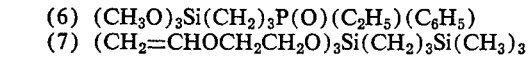
(2) 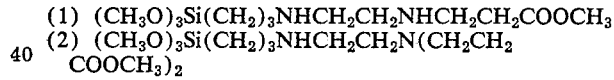
(3) $(CH_3O)_3Si(CH_2)_3NHCH_2CH_2NHCH_2CH_2COOCH_2CH_2OH$
(4) $(CH_3O)_3Si(CH_2)_3NHCH_2CH_2NH_2 \cdot HOOCCH_3$ In the following three examples various cements were also tested and rated visually as to the degree of surface scaling. The method employed was similar to the one employed by the Portland Cement Association and the U.S. Bureau of Public Roads in their freeze-thaw work. This method is described by Verbeck et al. in the Highway Research Board Bulletin 150 (1957), pages 1 to 13. Procedure 2 of the test was employed with the following exceptions. The specimens used in the scaling test were slabs 2" in depth and 5" x 9" in area. The slabs were cast in oiled wood molds and a 2 percent sodium chloride solution was used instead of water. Also a freeze-thaw cycle of −17° F. to 70° F. was employed. The slabs were rated on a scale of from 1 to 5. A rating of 1 equals very slight scaling, 2 equals slight scaling, 3 equals moderate scaling, 4 equals severe scaling and 5 equals failure of the slab. A plus (+) attached to the rating indicates that the scaling was localized. A rating of 2+ is considered better than a rating of 2, 3+ better than 3, etc.

EXAMPLE 13

The concrete employed in this example was prepared by mixing 27 pounds of Portland cement, 90.2 pounds of crushed limestone aggregate, 64.25 pounds of sand (¼" particle size and smaller) and about 13.5 pounds of water. The air entraining agent (control) or silane was added after a portion of the water had been mixed with the other ingredients. The scaling ratings of tests run on this concrete are set forth in the following table.

*Table VIII*

| Material | Wt. percent conc. | Percent Air | Scaling ratings (after) specified No. of cycles | | | |
|---|---|---|---|---|---|---|
| | | | 7 | 14 | 21 | 35 |
| Darex AEA | .033 | 4.2 | 3+ | 3+ | 3+ | |
| $H_2N(CH_2)_2NH(CH_2)_3Si(OCH_3)_3$ | .5 | 2.8 | 2 | 2 | 2 | 2 |
| $H_2C=C(CH_3)COO(CH_2)_3Si(OCH_3)_3$ | .3 | 17 | 1 | 1 | 1 | 1 |
| 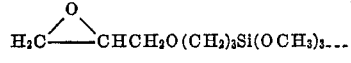 | .3 | 2.3 | 2 | 2 | 3+ | 3 |
| *Darex AEA | .133 | 5.2 | 4+ | 4+ | 4 | 4 |
| *$H_2N(CH_2)_2NH(CH_2)_3Si(OCH_3)_3$ | .2 | 3.1 | 1 | 1 | 1 | 1 |

*10% sodium chloride solution used.

EXAMPLE 14

The concrete employed in this example was prepared in the same manner as the concrete of Example 13 except that 24.8 pounds of cement, 87.1 pounds of aggregate, 64.6 pounds of sand and about 13 pounds of water were used. The scaling ratings of tests run on this concrete are set forth in the following table.

*Table IX*

| Material | Wt. percent conc. | Percent Air | Scaling ratings (after) specified No. of cycles | | | |
|---|---|---|---|---|---|---|
| | | | 7 | 14 | 21 | 35 |
| Darex AEA | .133 | 5.1 | 3+ | 3+ | 3 | 3 |
| $H_2N(CH_2)_2NH(CH_2)_3Si(OCH_3)_3$ | .1 | 5 | 1+ | 1+ | 1+ | 2+ |
| Morpholine oleate | .1 | | | | | |
| $H_2N(CH_2)_2NH(CH_2)_3Si(OCH_3)_3$ | .2 | 7.5 | 1+ | 1+ | 1+ | 2+ |
| Morpholine oleate | .1 | | | | | |
| $H_2N(CH_2)_2NH(CH_2)_3Si(OCH_3)_3$ | .2 | 6 | 1+ | 2 | 2 | 3+ |
| Morpholine oleate | .05 | | | | | |
| $H_2N(CH_2)_3Si(OC_2H_5)_3$ | .3 | 4.2 | 1+ | 2+ | 2+ | |
| Morpholine oleate | .05 | | | | | |

EXAMPLE 15

The concrete employed in this example was prepared in the same manner as the concrete of Example 13 except that 31.7 pounds of cement, 87.1 pounds of aggregate, 59.2 pounds of sand and about 13 pounds of water were used. The scaling ratings of tests run on this concrete are set forth in the following table.

*Table X*

| Material | Wt. percent conc. | Percent Air | Scaling ratings (after) specified No. of cycles | | | |
|---|---|---|---|---|---|---|
| | | | 7 | 14 | 21 | 35 |
| Darex AEA | .133 | 4 | 3 | 4+ | 4+ | 4 |
| $C_6H_5Si(OCH_3)_3$ | .2 | 4 | 1+ | 2+ | 2+ | |
| Morpholine oleate | .1 | | | | | |
| $C_6H_5Si(OCH_3)_3$ | .3 | 4.5 | 2+ | 2+ | 2+ | |
| Morpholine oleate | .05 | | | | | |
| $H_2N(CH_2)_2NH(CH_2)_3Si(OCH_3)_3$ | .3 | 6.8 | 2+ | 2+ | | |
| Morpholine oleate | .05 | | | | | |

That which is claimed is:

1. A method which comprises incorporating in a concrete mix from 0.05 to 3 percent by weight based on the weight of the Portland cement in the concrete of a silane of the formula $ZSi(OR')_3$, wherein Z is a member selected from the group consisting of hydrocarbon groups and substituted hydrocarbon groups in which the substituent is bonded to the silicon atom through at least one carbon atom, and R' is selected from the group consisting of alkyl radicals of from 1 to 3 inclusive carbon atoms, $-CH_2CH_2OR'''$ and $-CH_2CH_2OH$ where R''' is an aliphatic hydrocarbon radical of 1 to 3 inclusive carbon atoms, whereby an improved concrete is obtained.

2. The method of claim 1 in which an air entraining agent is also incorporated in the concrete mix.

3. The method of claim 1 in which Z is a hydrocarbon group.

4. The method of claim 3 in which an air entraining agent is also incorporated in the concrete mix.

5. A method which comprises incorporating in a concrete mix from 0.05 to 3 percent by weight based on the weight of the Portland cement in the concrete of a silane of the formula $RSi(OR')_3$, wherein R is selected from the group consisting of phenyl and aliphatic hydrocarbon radicals of from 1 to 18 inclusive carbon atoms and R' is selected from the group consisting of alkyl radicals of from 1 to 3 inclusive carbon atoms, $-CH_2CH_2OCH_3$ and —CH₂CH₂OH, whereby an improved concrete is obtained.

6. A method which comprises incorporating in a concrete mix from 0.05 to 3 percent by weight based on the weight of the Portland cement in the concrete of methyltrimethoxysilane, whereby an improved concrete is obtained.

7. A method which comprises incorporating in a concrete mix from 0.05 to 3 percent by weight based on the weight of the Portland cement in the concrete of a silane of the formula R″Si(OCH₃)₃, wherein R″ is an aliphatic hydrocarbon radical of 2 carbon atoms, whereby an improved concrete is obtained.

8. A method which comprises incorporating in a concrete mix from 0.05 to 1 percent by weight based on the weight of the Portland cement in the concrete of a silane of the formula R″″Si(OCH₃)₃, where R″″ is an aliphatic hydrocarbon radical of 3 carbon atoms, whereby an improved concrete is obtained.

9. A method which comprises incorporating in a concrete mix from 0.05 to 3 percent by weight based on the weight of Portland cement in the concrete of a silane of the formula MSi(OCH₃)₃, wherein M is an aliphatic hydrocarbon radical of from 4 to 18 inclusive carbon atoms, whereby an improved concrete is obtained.

10. A method which comprises incorporating in a concrete mix from 0.05 to 0.75 percent by weight based on the weight of the Portland cement in the concrete of phenyltrimethoxysilane, whereby an improved concrete is obtained.

11. The method of claim 6 in which an air entraining agent is also incorporated in the concrete mix.

12. The method of claim 1 in which Z is a substituted hydrocarbon group.

13. The method of claim 12 in which an air entraining agent is also incorporated in the concrete mix.

14. The method of claim 12 wherein Z is an amino-substituted hydrocarbon group.

15. An improved concrete having admixed therewith from 0.05 to 3 percent by weight based on the weight of Portland cement in the concrete of a silane of the formula ZSi(OR′)₃, wherein Z is a member selected from the group consisting of hydrocarbon groups and substituted hydrocarbon groups in which the substituent is bonded to the silicon atom through at least one carbon atom, and R′ is selected from the group consisting of alkyl radicals of from 1 to 3 inclusive carbon atoms, —CH₂CH₂OR‴ and —CH₂CH₂OH in which R‴ is an aliphatic hydrocarbon radical of 1 to 3 inclusive carbon atoms.

16. The improved concrete of claim 15 which also has an air entraining agent admixed therewith.

17. The improved concrete of claim 15 in which Z is a hydrocarbon group.

18. The improved concrete of claim 17 which also has an air entraining agent admixed therewith.

19. The improved concrete of claim 15 in which Z is a substituted hydrocarbon group.

20. The improved concrete of claim 19 which also has an air entraining agent admixed therewith.

21. The improved concrete of claim 19 wherein Z is an amino-substituted hydrocarbon group.

22. An improved concrete having admixed therewith from 0.05 to 3 percent by weight based on the weight of Portland cement in the concrete of a silane of the formula RSi(OR′)₃, wherein R is selected from the group consisting of phenyl and aliphatic hydrocarbon radicals of from 1 to 18 inclusive carbon atoms and R′ is selected from the group consisting of alkyl radicals of from 1 to 3 carbon atoms, —CH₂CH₂OCH₃ and —CH₂CH₂OH.

23. An improved concrete having admixed therewith from 0.05 to 3 percent by weight based on the weight of the Portland cement in the concrete of methyltrimethoxysilane.

24. An improved concrete having admixed therewith from 0.05 to 3 percent by weight based on the weight of the Portland cement in the concrete of a silane of the formula R″Si(OCH₃)₃, wherein R″ is an aliphatic hydrocarbon radical of 2 carbon atoms.

25. An improved concrete having admixed therewith from 0.05 to 1 percent by weight based on the weight of the Portland cement in the concrete of a silane of the formula R″″Si(OCH₃)₃, wherein R″″ is an aliphatic hydrocarbon radical of 3 carbon atoms.

26. An improved concrete having admixed therewith from 0.05 to 3 percent by weight based on the weight of the Portland cement in the concrete of a silane of the formula MSi(OCH₃)₃, wherein M is an aliphatic hydrocarbon radical of from 4 to 18 inclusive carbon atoms.

27. An improved concrete having admixed therewith from 0.05 to 0.75 percent by weight based on the weight of Portland cement in the concrete of phenyltrimethoxysilane.

28. The improved concrete of claim 27 which also has an air entraining agent admixed therewith.

29. A method which comprises incorporating in a concrete mix from 0.05 to 3% by weight based on the weight of the Portland cement in the concrete of a silane of the formula H₂NCH₂CH₂NHCH₂CH₂CH₂Si(OCH₃)₃, wherean improved concrete is obtained.

30. The method of claim 29 in which an air entraining agent is also incorporated in the concrete mix.

31. A method which comprises incorporating in a concrete mix from 0.05 to 3% by weight based on the weight of the Portland cement in the concrete of a silane of the formula H₂NCH₂CH₂NHCH₂CH(CH₃)CH₂Si(OCH₃)₃, whereby an improved concrete is obtained.

32. The method of claim 31 in which an air entraining agent is also incorporated in the concrete mix.

33. A method which comprises incorporating in a concrete mix from 0.05 to 3% by weight based on the weight of the Portland cement in the concrete of a silane of the formula H₂NCH₂CH₂CH₂Si(OC₂H₅)₃, whereby an improved concrete is obtained.

34. A method which comprises incorporating in a concrete mix from 0.05 to 3% by weight based on the weight of the Portland cement in the concrete of a silane of the formula ClCH₂CH₂CH₂Si(OR′)₃, wherein R′ is selected from the group consisting of alkyl radicals of from 1 to 3 inclusive carbon atoms, —CH₂CH₂OCH₃ and —CH₂CH₂OH, whereby an improved concrete is obtained.

35. A method which comprises incorporating in a concrete mix from 0.05 to 3% by weight based on the weight of the Portland cement in the concrete of a silane of the formula CF₃CH₂CH₂Si(OR′)₃, wherein R′ is selected from the group consisting of alkyl radicals of from 1 to 3 inclusive carbon atoms, —CH₂CH₂OCHS₃ and —CH₂CH₂OH, whereby an improved concrete is obtained.

36. A method which comprises incorporating in a concrete mix from 0.05 to 3% by weight based on the weight of the Portland cement in the concrete of a silane of the formula Cl₂C₆H₃Si(OR′)₃, wherein R′ is selected from the group consisting of alkyl radicals of from 1 to 3 inclusive carbon atoms, —CH₂CH₂OCHS₃ and —CH₂CH₂OH, whereby an improved concrete is obtained.

37. A method which comprises incorporating in a concrete mix from 0.05 to 3% by weight based on the weight of the Portland cement in the concrete of a silane of the formula NCCH₂CH₂Si(OR′)₃, wherein R′ is selected from the group consisting of alkyl radicals of from 1 to 3 inclusive, carbon atoms, —CH₂CH₂OCH₃ and —CH₂CH₂OH, whereby an improved concrete is obtained.

38. A method which comprises incorporating in a concrete mix from 0.05 to 3% by weight based on the weight of the Portland cement in the concrete of a silane of the formula (CH₃)₂NCH₂CH₂CH₂Si(OR′)₃, wherein R′ is selected from the group consisting of alkyl radicals of from 1 to 3 inclusive carbon atoms, —CH₂CH₂OCH₃ and —$CH_2CH_2OH$, whereby an improved concrete is obtained.

39. A method which comprises incorporating in a concrete mix from 0.05 to 3% by weight based on the weight of the Portland cement in the concrete of a silane of the formula

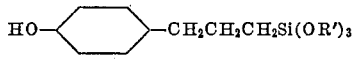

wherein R′ is selected from the group consisting of alkyl radicals of from 1 to 3 inclusive carbon atoms, —$CH_2CH_2OCH_3$ and —$CH_2CH_2OH$, whereby an improved concrete is obtained.

40. A method which comprises incorporating in a concrete mix from 0.05 to 3% by weight based on the weight of the Portland cement in the concrete of a silane of the formula $CH_2=C(CH_3)COOCH_2CH_2CH_2Si(OR')_3$, wherein R′ is selected from the group consisting of alkyl radicals of from 1 to 3 inclusive carbon atoms, —$CH_2CH_2OCH_3$ and —$CH_2CH_2OH$, whereby an improved concrete is obtained.

41. A method which comprises incorporating in a concrete mix from 0.05 to 3% by weight based on the weight of the Portland cement in the concrete of a silane of the formula

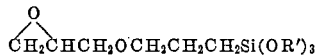

wherein R′ is selected from the group consisting of alkyl radicals of from 1 to 3 inclusive carbon atoms, —$CH_2CH_2OCH_3$ and —$CH_2CH_2OH$, whereby an improved concrete is obtained.

42. An improved concrete having admixed therewith from 0.05 to 3% by weight based on the weight of Portland cement in the concrete of a silane of the formula $H_2NCH_2CH_2NHCH_2CH_2CH_2Si(OCH_3)_3$.

43. The improved concrete of claim 42 which also has an air entraining agent admixed therewith.

44. An improved concrete having admixed therewith from 0.05 to 3% by weight based on the weight of Portland cement in the concrete of a silane of the formula $H_2NCH_2CH_2NHCH_2CH(CH_3)CH_2Si(OCH_3)_3$.

45. The improved concrete of claim 44 which also has an air entraining agent admixed therewith.

46. An improved concrete having admixed therewith from 0.05 to 3% by weight based on the weight of Portland cement in the concrete of a silane of the formula $H_2NCH_2CH_2CH_2Si(OC_2H_5)_3$.

47. An improved concrete having admixed therewith from 0.05 to 3% by weight based on the weight of Portland cement in the concrete of a silane of the formula $ClCH_2CH_2CH_2Si(OR')_3$, wherein R′ is selected from the group consisting of alkyl radicals of from 1 to 3 inclusive carbon atoms, —$CH_2CH_2OCH_3$ and —$CH_2CH_2OH$.

48. An improved concrete having admixed therewith from 0.05 to 3% by weight based on the weight of Portland cement in the concrete of a silane of the formula $CF_3CH_2CH_2Si(OR')_3$, wherein R′ is selected from the group consisting of alkyl radicals of from 1 to 3 inclusive carbon atoms, —$CH_2CH_2OCH_3$ and —$CH_2CH_2OH$.

49. An improved concrete having admixed therewith from 0.05 to 3% by weight based on the weight of Portland cement in the concrete of a silane of the formula $Cl_2C_6H_3Si(OR')_3$, wherein R′ is selected from the group consisting of alkyl radicals of from 1 to 3 inclusive carbon atoms, —$CH_2CH_2OCH_3$ and —$CH_2CH_2OH$.

50. An improved concrete having admixed therewith from 0.05 to 3% by weight based on the weight of Portland cement in the concrete of a silane of the formula $NCCH_2CH_2Si(OR')_3$, wherein R′ is selected from the group consisting of alkyl radicals of from 1 to 3 inclusive carbon atoms, —$CH_2CH_2OCH_3$ and —$CH_2CH_2OH$.

51. An improved concrete having admixed therewith from 0.05 to 3% by weight based on the weight of Portland cement in the concrete of a silane of the formula $(CH_3)_2NCH_2CH_2CH_2Si(OR')_3$, wherein R′ is selected from the group consisting of alkyl radicals of from 1 to 3 inclusive carbon atoms, —$CH_2CH_2OCH_3$ and —$CH_2CH_2OH$.

52. An improved concrete having admixed therewith from 0.05 to 3% by weight based on the weight of Portland cement in the concrete of a silane of the formula

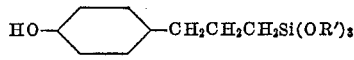

wherein R′ is selected from the group consisting of alkyl radicals of from 1 to 3 inclusive carbon atoms, —$CH_2CH_2OCH_3$ and —$CH_2CH_2OH$.

53. An improved concrete having admixed therewith from 0.05 to 3% by weight based on the weight of Portland cement in the concrete of a silane of the formula $CH_2=C(CH_3)COOCH_2CH_2CH_2Si(OR')_3$, wherein R′ is selected from the group consisting of alkyl radicals of from 1 to 3 inclusive carbon atoms, —$CH_2CH_2OCH_3$ and —$CH_2CH_2OH$.

54. An improved concrete having admixed therewith from 0.05 to 3% by weight based on the weight of Portland cement in the concrete of a silane of the formula

wherein R′ is selected from the group consisting of alkyl radicals of from 1 to 3 inclusive carbon atoms, —$CH_2CH_2OCH_3$ and —$CH_2CH_2OH$.

References Cited by the Examiner
UNITED STATES PATENTS
2,491,487  12/49  Faulwetter _____ 106—90

FOREIGN PATENTS
1,207,978  9/59  France.

OTHER REFERENCES
McGregor: "Silicone and Their Uses," McGraw-Hill, 1954, pages 267–279.

Meals et al.: "Silicones," Reinhold Publication Corporation, New York, 1959, page 108.

TOBIAS E. LEVOW, *Primary Examiner.*

UNITED STATES PATENT OFFICE
CERTIFICATE OF CORRECTION

Patent No. 3,190,762                                           June 22, 1965

Barber C. Carlson et al.

It is hereby certified that error appears in the above numbered patent requiring correction and that the said Letters Patent should read as corrected below.

Column 8, line 38, for "$CH_2=CHSI(OCH_3)_3$" read -- $CH_2=CHSi(OCH_3)_3$ --; column 11, line 60, for "$(C_2H_5O)_3Si(CH_2)CN$" read -- $(C_2H_5O)_3Si(CH_2)_2CN$ --; column 16, line 22, for "where-" read -- whereby --; lines 51 and 59, for "$-CH_2CH_2OCHS_3$", each occurrence, read -- $-CH_2CH_2OCH_3$ --; column 17, line 48, for "$H_2NCH_2CH_2CH_2Si,OC_2H_5)_3$" read -- $H_2NCH_2CH_2CH_2Si(OC_2H_5)_3$ --.

Signed and sealed this 29th day of March 1966.

(SEAL)
Attest:

ERNEST W. SWIDER
Attesting Officer

EDWARD J. BRENNER
                                                                                                 Commissioner of Patents